United States Patent [19]

Rabe et al.

[11] Patent Number: 5,717,873
[45] Date of Patent: Feb. 10, 1998

[54] DEADLOCK AVOIDANCE MECHANISM AND METHOD FOR MULTIPLE BUS TOPOLOGY

[75] Inventors: Jeffrey L. Rabe, Gold River; Nicholas D. Wade, Folsom, both of Calif.; Bruce Young, Tigard, Oreg.

[73] Assignee: Intel Corporation, Santa Clara, Calif.

[21] Appl. No.: 734,730

[22] Filed: Oct. 21, 1996

Related U.S. Application Data

[63] Continuation of Ser. No. 575,179, Dec. 19, 1995, abandoned, which is a continuation of Ser. No. 129,665, Sep. 30, 1993, abandoned.

[51] Int. Cl.$^6$ ..................................................... G06F 13/28
[52] U.S. Cl. ........................... 395/290; 395/842; 370/402
[58] Field of Search .............................. 370/402; 395/290, 395/308, 309, 847, 848, 842, 288, 293, 726

[56] References Cited

U.S. PATENT DOCUMENTS

| | | | |
|---|---|---|---|
| 4,868,741 | 9/1989 | Gula et al. | 395/293 |
| 4,878,166 | 10/1989 | Johnson et al. | 395/307 |
| 4,974,153 | 11/1990 | Pimm et al. | 395/288 |
| 5,479,636 | 12/1995 | Vanka et al. | 395/460 |
| 5,499,346 | 3/1996 | Amini et al. | 395/308 |
| 5,522,050 | 5/1996 | Amini et al. | 395/306 |
| 5,535,341 | 7/1996 | Shah et al. | 370/402 |

OTHER PUBLICATIONS

*Multiprocessor Specification*, version 1.1, Apr. 1994, Intel. Intel Corporation 82378 System I/O (SIO), Publication No. 290473–003, Sep. 1993.

Intel Corporation Manual No. 290471–001, "Cache & DRAM Controller CDC 82424TX," Revision 1.0 (Nov. 1992).

Intel Corporation Manual No. 290472–001, "Data Path Unit DPU 82423TX," Revision 1.0 (Nov. 1992).

*Primary Examiner*—William M. Treat
*Attorney, Agent, or Firm*—Blakely, Sokoloff, Taylor & Zafman

[57] ABSTRACT

Apparatus and a method for eliminating deadlock in a multibus computer system which system includes a primary bus, and a secondary bus, a bridge circuit for joining the primary bus to a bus master, and a second bridge circuit for joining the primary bus to the secondary bus. The invention causes the second bridge circuit to generate a first signal directed to the all bridge circuits to indicate that a bus master on the secondary bus desires access to the secondary bus. All bridge circuits holding data directed to a component on the secondary bus flushes all temporary storage means holding data directed to a component on the secondary bus. The bridge circuits then generate signals to indicate that flushing is complete and the bus master on the secondary bus is granted access to the secondary bus. In one embodiment, the second bridge tests to determine whether the bus master requesting access requires a guaranteed access time and generates a signal to flush temporary storage in the first bridge between memory and the bridge.

22 Claims, 5 Drawing Sheets

DEADLOCK AVOIDANCE MECHANISM AND METHOD FOR MULTIPLE BUS TOPOLOGY

This is a continuation of application Ser. No. 08/575,179, filed Dec. 19, 1995, now abandoned, which is a continuation of application Ser. No. 08/129,665, filed Sep. 30, 1993, now abandoned.

BACKGROUND OF THE INVENTION

1. Field of the Invention

This invention relates to computer systems, and more particularly, to methods and apparatus for avoiding deadlock in the transfer of data in a computer system utilizing multiple buses.

2. History of the Prior Art

Historically, personal computers have utilized a single bus to transfer data between different internal components of the system. In personal computers using central processing units designed and manufactured by Intel Corporation of Santa Clara, Calif., such buses have typically been designed as either an Industry Standard Association (ISA) bus or an Expanded Industry Standard Association (EISA) bus. The ISA bus is a sixteen bit data bus while the EISA bus is thirty-two bits wide. These bus widths and the rates at which each of these buses is capable of operating have been found limiting so there have been a number of attempts to increase bus speed.

One recently implemented method of increasing bus speed is to provide an additional, so called, "local bus" which is more closely associated with the central processor than either of the above-mentioned buses and which is capable of running at speeds at which the processor itself runs. Those system components which require faster operation than has been available using the slower buses (such an output display card driving an output display device) are joined to this faster local bus. The slower ISA or EISA bus is continued in essentially unchanged form, and those components which are able to tolerate longer access times are associated with the slower bus. Although the theory behind using a local bus is good, many local bus designs have created conflicts in accessing components which actually slow the operation of the computer.

Intel Corporation has designed a new local bus which may be associated in a computer system with both with an Intel processor and with other buses such as an ISA bus or an EISA bus which are hereinafter referred to broadly as secondary buses. This new local bus provides faster throughput of data for selected components of the system without the conflicts which arise using other local bus systems. This new bus is referred to as the "peripheral component interconnect" (PCI) bus. A computer system using this PCI bus includes in addition to the physical PCI bus a first bridge circuit which controls the transfer of data among the PCI bus, the central processing unit, and main memory. A second bridge circuit is also arranged to control the transfer of data between the ISA or other secondary bus and the PCI bus. Thus, the arrangement is such that components on the PCI bus transfer and receive data through the first bridge to the central processor or to the main memory; while components on the ISA bus transfer and receive data through the second bridge to the PCI bus, through the PCI bus to components on the PCI bus, and through the first bridge between the PCI bus and the central processor to either the central processor or the main memory.

Modern computer systems use bus masters to speed the operation of the system. A bus master is a component capable of originating and controlling the transfer of data such as a direct memory access (DMA) unit. Typically a bus master includes its own processor and operates on its own internal clock. Bus masters may be associated with either the PCI bus or the secondary bus in a computer system using a PCI bus. The hardware of any bridge circuit joining a bus master to the PCI bus is designed according to a criteria by which write operations by one bus master which have begun must be completed before any read operation by any other bus master is allowed. On the other hand, a peculiarity of the ISA bus is that once an ISA bus master (such as a DMA unit) has gained control of the bus, it cannot be forced off the bus until it has completed its operation. It is thus possible for an ISA bus master to gain control of the ISA bus in an attempt to read from main memory or some other component joined to the PCI bus and face write operations already underway on the bus or triggered by the read cycle itself. In such a case, since the ISA bus master cannot be forced to relinquish control of the ISA bus until it has completed its read (or other) operation, a deadlock may occur with the central processing unit or another bus master on the PCI bus attempting to complete write operations. It is desirable to provide a method and apparatus for eliminating such deadlock conditions.

Another problem which may occur in the operation of a computer system utilizing both a PCI bus and an ISA or other secondary bus is that many secondary bus components have been designed to tolerate fixed intervals between the initiation of an operation and its completion. For example, ISA bus masters have typically been designed to tolerate an interval of only 2.5 microseconds from the time an operation is initiated on the ISA bus during which that operation may be suspended awaiting the completion of the cycle. However, if it is necessary for an ISA bus master to complete its access through an associated PCI bus, it is required to arbitrate access to the PCI bus (using hardware in the second bridge between the PCI bus and the secondary bus) with any other bus masters on the PCI bus. Normally, the arbiter controlling access to the PCI bus is not faced with this completion requirement time. Consequently, the PCI bus arbitration unit may be running other operations and be incapable of assuring that the ISA master will be able to complete its operation in the time required by the ISA bus.

SUMMARY OF THE INVENTION

It is, therefore, an object of the present invention to provide a method and apparatus for eliminating deadlock conditions in multiple bus computer systems.

It is another, more specific, object of the present invention to provide a method for eliminating deadlocks between bus masters on a PCI bus and bus masters on a secondary bus which cannot be forced to relinquish the secondary bus.

It is another object of the invention to guarantee an access time for secondary bus masters which require such a guarantee.

These and other objects of the present invention are realized in an apparatus and a method for eliminating deadlock in a multibus computer system which system includes a primary bus, and a secondary bus, a bridge circuit for joining the primary bus to a bus master, and a second bridge circuit for joining the primary bus to the secondary bus. The invention causes the second bridge circuit to generate a first signal directed to the all bridge circuits to indicate that a bus master on the secondary bus desires access to the secondary bus. All bridge circuits holding data directed to a component on the secondary bus flushes all temporary storage means holding data directed to a component on the secondary bus. The bridge circuits then generate signals to indicate that flushing is complete and the bus master on the secondary bus is grated access to the secondary bus. In one embodiment, the second bridge tests to determine whether the bus master requesting access requires a guaranteed access time and generates a signal to flush temporary storage in the first bridge between memory and the bridge and locks out all bus masters including the central processor.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
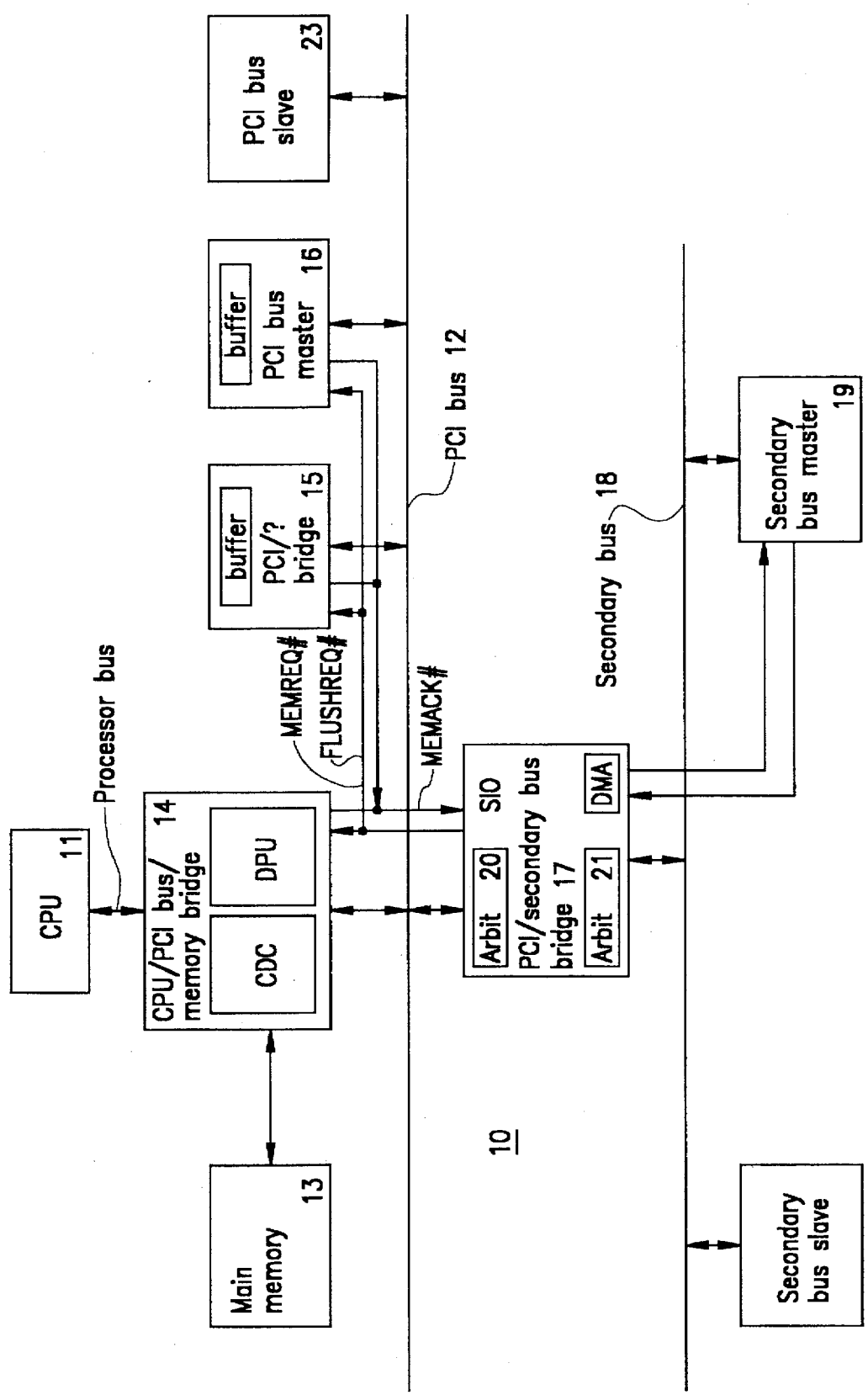
FIG. 1 is a block diagram of a computer system including a plurality of buses including at least a PCI bus and a secondary bus control of which may be gained by a bus master.

Referring now to FIG. 1, there is illustrated a computer system 10. The system 10 includes a central processor 11 such as an Intel i486 microprocessor which carries out the various instructions provided to the computer 10 for its operations. The central processor 11 is joined to a bus 12 adapted to carry information to various components of the system 10. The bus 12 is designed as a PCI bus in order to allow the transfer of data to and from the central processor 11 at a rate faster than is possible utilizing the typical ISA or EISA buses used by the prior art. The processor 11 is joined to the bus 12 by a bridge circuit 14 which is adapted to provide various functions necessary to the transfer. Also joined to the PCI bus 12 by the bridge circuit 14 is main memory 13 which is typically constructed of dynamic random access memory arranged in a manner well known to those skilled in the prior art to store information during a period in which power is provided to the system 10. The bridge circuit 14 is physically constructed to include both a cache and dram controller (CDC) chip and a data path unit (DPU) chip each of which is manufactured by Intel Corporation of Santa Clara, Calif. Detailed descriptions of these chips are provided in *Cache & DRAM Controller (CDC) 82424TX* and *Data Path Unit (DPU) 82423TX*, each published by Intel Corporation. In addition to various functions such as cache control and data synchronization which are not important to the present invention, the bridge circuit 14 includes circuitry for controlling and accomplishing the transfer of data among the CPU 11, main memory 13, and the PCI bus 12.

Also connected to the PCI bus 12 by bridge circuit 15 are various component circuits (not shown). The bridge circuit 15 is adapted to accomplish the same bridging functions for the connected component circuits as does the circuit 14. Such a circuit may include, for example, various bus master and bus slave interfacing components which allow the interconnection of another bus and its associated components to the PCI bus 12. Also connected to the PCI bus 12 is a PCI slave circuit 23 which may be connected to a video output card which includes a frame buffer which is adapted to store video signals to be transferred to an output device such as a monitor for display. A PCI bus master circuit 16 may also be connected to the PCI bus 12. The main properties of a PCI bus master are that it includes a microprocessor which functions at some internal clock rate and that it may initiate and control operations on the PCI bus 12.

Also connected to the PCI bus 12 is a PCI/secondary bus bridge circuit 17. The bridge circuit 17 performs the various functions necessary to transfer data between the PCI bus 12 and various component circuits joined to a secondary bus 18. The secondary bus 18 may be an ISA bus or a EISA bus which is capable of handling less data than is the bus 12 during a particular time period. A specific PCI to ISA bus bridge circuit 17 is a part of a chip referred to as a "system input/output" (SIO) circuit manufactured by Intel Corporation. Such a bridge is described in detail in a publication entitled *System I/O (SIO) 82378IB*, published by Intel Corporation. Such a bridge 17 includes circuitry for providing the interface between the PCI bus 12 and the secondary bus 18 so that data may be transferred therebetween. The bridge 17 provides circuitry which allows it to operate as an intercoupling bus master or a bus slave on the PCI bus 12. The ability of the bridge 17 to act as a PCI bus master allows a bus master circuit 19 positioned on the secondary bus 18

(for example, local area network (LAN) circuitry) to gain access to the PCI bus 12 and thence to the main memory. The SIO chip which includes the bridge 17 also includes a first arbiter circuit 20 for controlling access to the PCI bus 12 and a second arbiter circuit 21 for controlling access to the secondary bus 18.

Figures 2, 3:
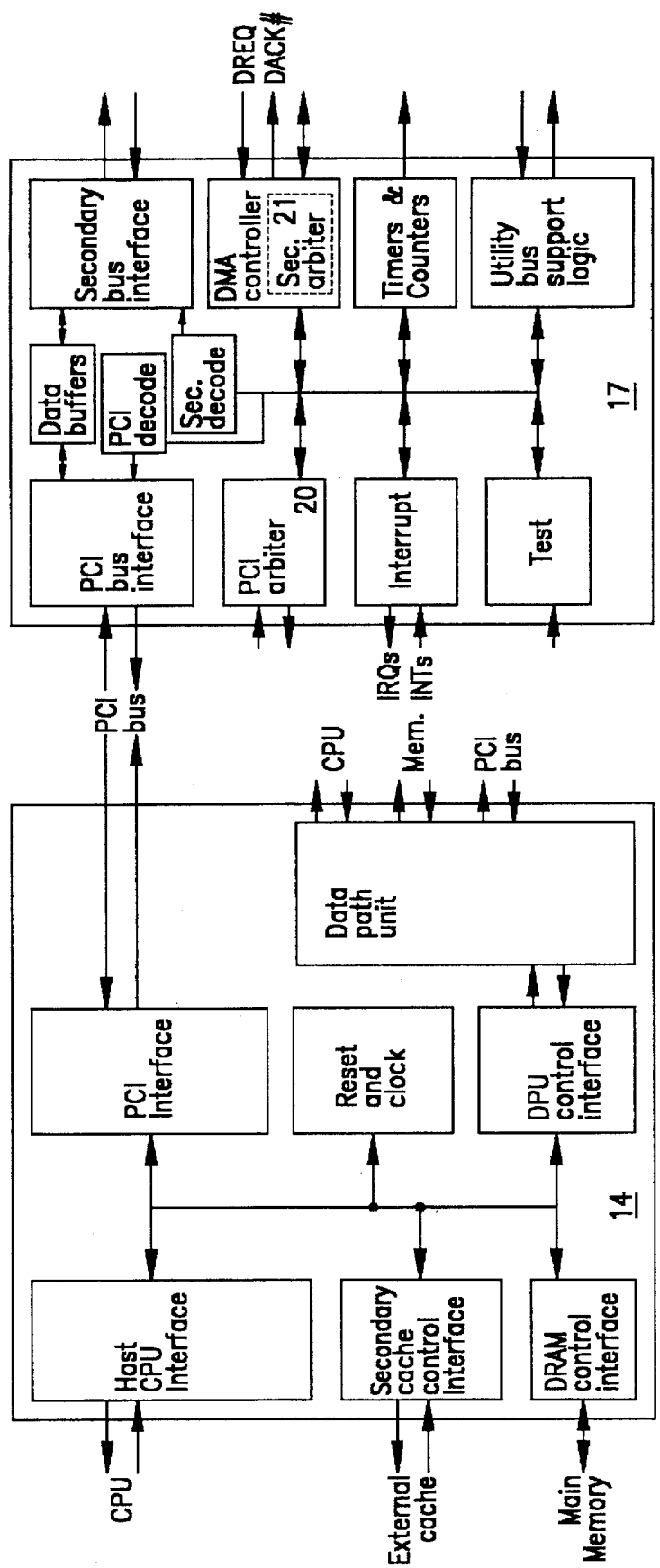
FIG. 2 is a block diagram of a first bridge circuit for connecting a central processor and main memory to a PCI bus.
FIG. 3 is a block diagram of a second bridge circuit for connecting a PCI bus to components joined to a secondary bus.

FIG. 2 is a block diagram which illustrates the component circuits included within a bridge circuit 14. The circuit 14 includes a host CPU interface circuit which transfers control signals between the processor 11 and the bridge 14, a PCI interface circuit which transfers control signals between the bridge 14 and the PCI bus 12, a secondary cache control circuit which interfaces with external cache circuitry (not illustrated), a dram control interface circuit which interfaces with the main memory 13, a reset and clock circuit which receives the clock signals provided by the various associated circuits and provides clock signals to those circuits, and a data path unit control interface. The data path unit control interface includes circuitry for providing control signals to data buffers of a data path unit (DPU) in which data may be stored during transfer to the main memory 13 or to the PCI bus 12. The data path unit includes the data path for data transfers among the processor 11, main memory 13, and the bus 12. The various circuit components joined to the PCI bus 12 may store data in these buffers during any period in which the data being written must be delayed before it may be used. For example, a particular operation may be occurring under control of a PCI master when processor 11 desires to write data to a device on the PCI bus. In such a case, the data from the processor may be stored in the buffers of the DPU until the host bus bridge on behalf of the processor gains control of the PCI bus 12 through arbitration.

One way in which the operation of the computer system using the PCI bus is made faster is that operations on the PCI bus 11 and operations the ISA bus 18 may take place at the same time so long as the operations on any bus are limited to that particular bus. The PCI bus 12 has been designed particularly with this purpose in mind. As mentioned above, the arbitration unit 20 for the PCI bus is physically located in the SIO chip which includes the bridge 17 between the PCI bus 12 and the ISA bus 18. This arbitration unit 20 and the bridges are adapted to allow concurrent operations by bus masters on the PCI bus 12. In order to allow such concurrent operations, the individual bridges provide automatic control by which any write from a bus master on a bridge posted to a buffer in the bridge on the PCI bus must be completed before a read to that bridge from any other PCI bus master is allowed. This order of procedure is followed because it is possible for a processor to have written data to a some address and to have stored a flag in main memory indicating that the data is valid before all of the data actually reaches the ultimate address; some portion of the data may still be in a buffer in one of the bridge circuits so that data is not, in fact, valid when the flag is read by another bus master. The bridge 14 and other bridges joined to the PCI bus are able to perform this and various other functions in order to see that the rules of data transfer are adhered to so that a plurality of processors may concurrently utilize the PCI bus. Another of these functions is to require a "backoff" by any PCI bus master so that a particular operation can be completed by another component. Thus, various operations may be controlled concurrently by the PCI arbiter 20.

FIG. 3 is a block diagram of the components of a SIO (82378IB) chip including a bridge circuit 17. The SIO chip includes a PCI interface circuit which transfers data between the bridge 17 and the PCI bus 12, a PCI bus arbiter which arbitrates access to the PCI bus, a pair of address decoder circuits for decoding PCI initiated and ISA initiated addresses so that the two buses may run concurrently, an ISA/bridge interface circuit, data buffers for storing data transferred by the bridge 17, a DMA unit which may include the physical components of an ISA bus arbiter 21, and various other circuits which are utilized for operations but are not important to the present invention.

Unfortunately, the ISA bus is not as modern as the PCI bus. The ISA bus was not designed to allow concurrent use by a plurality of processors. The manner in which the SIO unit allows an ISA bus master to function is unique to the ISA bus. The ISA bus was designed at a time when it was not expected that multiple masters would appear on the bus. However, the ability to provide for direct memory access was provided on the ISA bus. Thus, the SIO chip contains a DMA unit which may be programmed by another processor (typically the central processing unit) with starting and ending addresses and is capable of transferring data from the starting to the ending address without intervention of the processor which provides the addresses. The DMA device does this by generating a sequence of addresses from which data is to be read or written beginning with the starting address provided by the processor and byte count information designating the number of bytes of data which are to be transferred. This allows direct transfers of data to occur while the central processing unit is handling other operations and, consequently, speeds operations on the ISA bus.

The DMA unit of the SIO chip may operate in either of a pair of states. The first state is that described above. In a second state called a cascade state, one or more additional DMA devices may be connected to the first DMA device; and the first DMA device will provide the necessary control signals for moving data on the ISA bus from one memory position to another. However, in this second cascade state, the DMA device contained in the SIO chip does not furnish the sequential addresses for the transfer; these addresses are furnished by the second DMA device. In this manner, direct transfers of data may be controlled on the ISA bus by additional DMA controllers using the signal generating capabilities of the DMA unit of the SIO chip.

The DMA unit in the SIO device has been used to allow ISA bus masters in addition to other DMA units to utilize the ISA bus. By providing ISA bus masters which generate the appropriate signals to cause the DMA unit in the SIO device to recognize those ISA bus masters as DMA units, the operations of an ISA bus master have been incorporated into the ISA bus. Thus, an ISA bus master generates a control signal (DREQ) which the DMA unit of the SIO chip expects from another DMA unit in order to initiate use of the DMA unit and responds to a control signal (DACK#) which the DMA unit of the SIO chip generates to acknowledge a data request. In this description, the sign # designates an active low signal. The ISA bus master can then utilize the facilities of the DMA unit of the SIO chip to move data on the ISA bus. In such a case, the ISA bus master furnishes the addresses necessary for the transfer of data, and the DMA unit generates the control signals necessary to obtain access to the bus.

However, since historically only one processor at a time is expected in the system which includes only an ISA bus, once an ISA bus master has gained control of the ISA bus, the ISA bus operation must be completed. Thus, a situation exists in which, for example, a PCI bus master may have placed data in a write buffer of a bridge circuit 14 or a similar bridge circuit to the PCI bus expecting to write to a device on the ISA bus while an ISA bus master has gained access to the ISA bus in order to read from main memory. The bridge 14 enforces that write operations are to be completed before read operations and therefore expects that the processor write operation is to be completed first. On the other hand, the operation of the bridge 17 in dealing with ISA masters is such that the ISA operation is to be completed before another operation can be begun. This causes a deadlock condition to exist is which neither operation may be completed. The present invention has been devised to cure this deadlock condition.

Another problem which may occur in the operation of a computer system utilizing both a PCI bus and a secondary bus such as an ISA bus is that ISA bus components (and, similarly, other secondary bus components) have typically been designed to tolerate an interval of only 2.5 microseconds from the time an operation is initiated on the ISA bus during which the operation may be suspended awaiting the completion of the cycle. However, if it is necessary for an ISA bus master to complete its access through an associated PCI bus, the ISA bus master is required to arbitrate access to the PCI bus with any other bus masters on the PCI bus. Normally, the arbiter controlling access to the PCI bus is not faced with this completion requirement time. Consequently, the PCI bus arbitration unit must provide some manner of assuring that the ISA bus master may complete its operation in the time required by the ISA bus.

Figure 4:
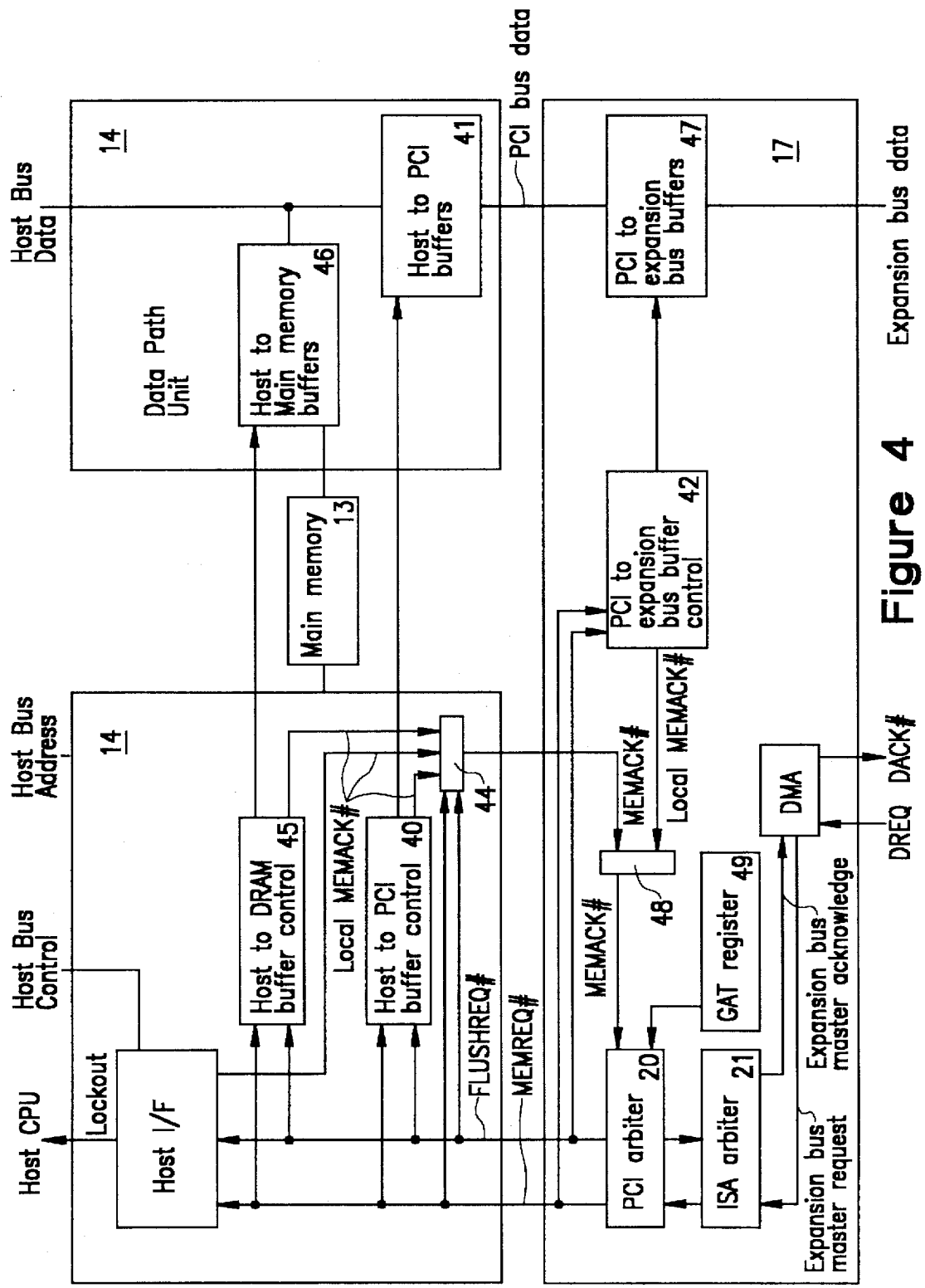
FIG. 4 is a functional block diagram illustrating the operation of the present invention.

FIG. 4 illustrates a functional block diagram of those components of the bridges 14 and 17 which are utilized in accordance with the present invention. The arrangement provides solutions to both of the problems discussed above. The arrangement eliminates the deadlock condition which could otherwise occur when an ISA bus master (or other bus master on a secondary bus which gains complete control of the secondary bus) gains control of the ISA bus and a PCI bus bridge has data from a write operation directed to a component on the ISA (secondary) bus posted to a write buffer in a PCI bridge circuit. The arrangement also overcomes the time-to-complete problem faced by ISA components or components having similar time-to-complete problems.

Figure 6:
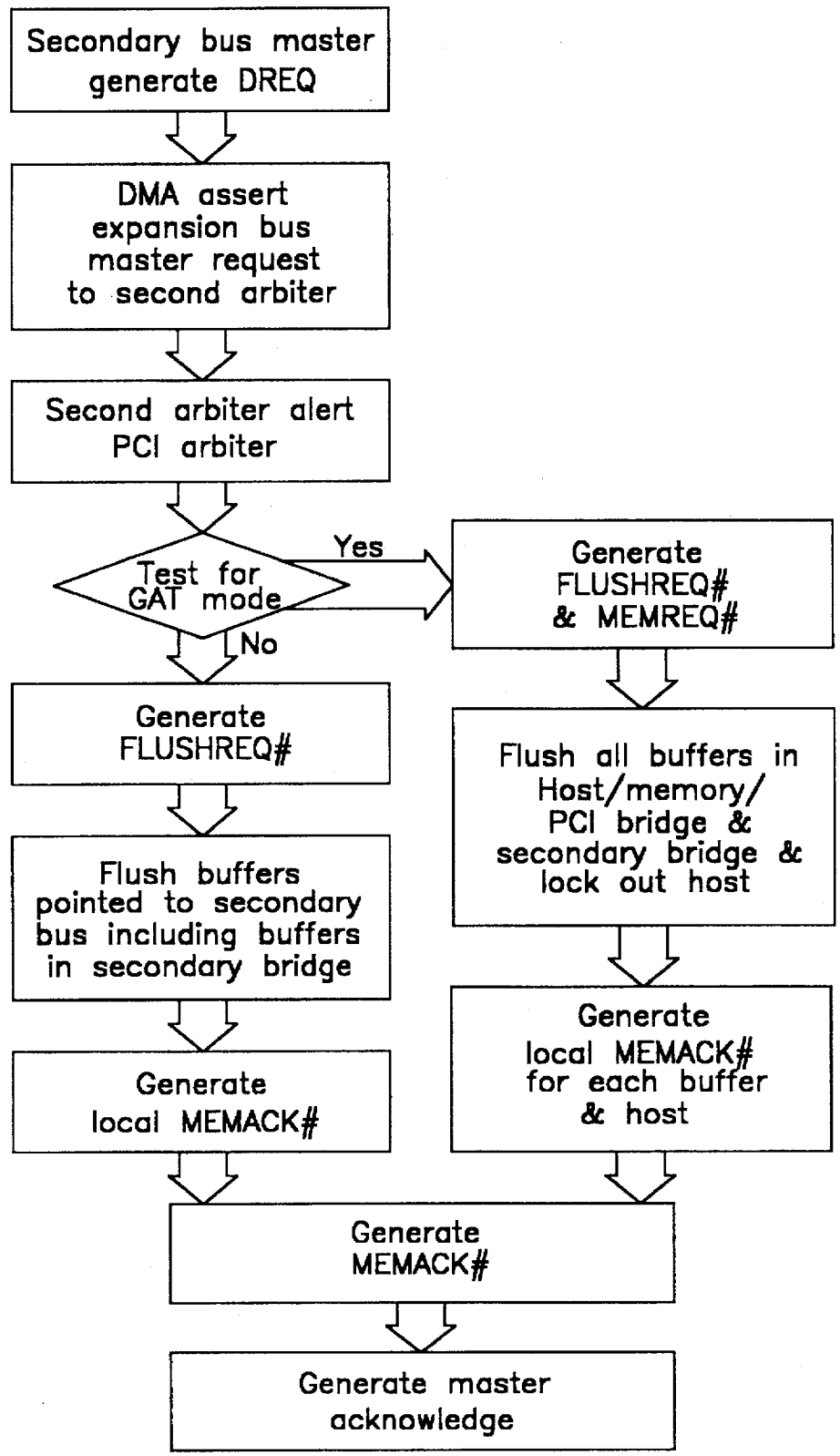
FIG. 6 is a flow chart illustrating a method of practicing the present invention.

In order to accomplish these desirable results, certain requirements must be met before an ISA bus master can gain access to the ISA bus. The details of the process which is followed in the present invention may be better understood by considering the flow chart describing the operation in FIG. 6. In typical arbitration arrangements, a bus master desiring to use a bus signals that it desires access and waits for the arbitration unit to grant it access. Because an ISA bus master cannot be forced to release the ISA bus until its operation is completed, it is necessary to assure that this may in fact occur before granted the ISA master access to the ISA bus. When an ISA master requests access to the ISA bus through the DMA unit of the SIO bridge, it asserts the signal DREQ. The DMA unit recognizes the signal in the cascade mode as a request for access to the ISA bus. The DMA unit asserts an expansion bus master request. The DMA unit asserts the same expansion bus master request signal (which may be a DREQ signal) when it desires access to the ISA bus. This signal is recognized by the ISA arbiter 21. The arbiter 21 indicates to the PCI arbiter 20 that a request for the ISA bus has been received from an ISA bus master.

In order to relieve the deadlock condition which may occur when there is posted write data in PCI bridge buffers which data is directed to a component on the ISA bus and an ISA bus master has gained access of the ISA bus in an attempt to read through the same bridge, the present invention provides a number of control signals which are used during arbitration by an ISA bus master. In one embodiment of the invention, these are hardware signals so that traffic on the PCI bus 12 is not increased. In response to the indication from the arbiter 21 that an ISA master is requesting access to the ISA bus, the PCI arbiter 20 generates a first FLUSHREQ# signal which signal requests that the PCI bridges connected to the PCI bus 12 flush any data posted to write buffers from which data might be transferred to the ISA bus (data which might create the deadlock described above). This FLUSHREQ# signal is received by the bridges to the PCI bus (such as the bridge 14). Each of these bridges responds to the FLUSHREQ# signal by determining whether any data is posted to its write buffers from which data may be sent to the ISA bus, flushing any data posted to those write buffers and disabling them, and writing the data flushed to the addresses to which it is directed. This requires that any bridge to the PCI bus to which data is posted become the bus master of the PCI bus to accomplish the completion of the write operation, a normal operation controlled in cooperation with the PCI arbiter 20.

In the bridge 14 illustrated in FIG. 4, the FLUSHREQ# signal is sent to a host-to-PCI buffer control circuit 40, to a host interface circuit 43, to a host-to-main memory buffer control circuit 45, and to a summing circuit 44. Because the only data which may conceivably be sent to the ISA bus is that which may be stored in a set of host-to-PCI buffers 41, only these buffers 41 need to be flushed in the bridge 14. The host-to-PCI buffer control circuit 40 stores signals indicating the condition of the host-to PCI buffers 41. The circuit 40 responds to the FLUSHREQ# signal and with the arbiter 20 controls the host-to-PCI buffers 41 to flush the data by transferring it to its designated address in a flush operation. Flushing the buffer requires that the bridge 14 gain access to the PCI bus in order to complete its write operation. This is a normal operation of the PCI arbiter 20 and is explained in detail in the above-mentioned publications. When the flush operation (if necessary) has been completed (or if not necessary, immediately), the circuit 40 precludes further loading of the host-to-PCI buffers 41 and generates a local MEMACK# signal to indicate that the flushing has been completed. The FLUSHREQ# signal which has been sent to the summing circuit 44 controls the summing circuit 44 to transfer the single local MEMACK# signal to the bridge 17 to indicate the completion of the flush operation by the bridge 14.

The FLUSHREQ# signal is also directed within the SIO bridge 17 in its capacity as a PCI bus master and causes any data in buffers in the SIO bridge to be similarly flushed. More particularly, the FLUSHREQ# signal is transferred to a PCI-expansion-bus buffer control circuit 42. The circuit 42 stores signals indicating the condition of the PCI-to-Expansion-bus buffer 47. The circuit 42 in conjunction with the arbiter 20 controls the PCI-expansion-bus buffer 47 to flush the data by transferring it to its designated address in a flush operation. Upon completion of the flush operation, the circuit 42 generates a local MEMACK# signal to indicate this fact.

Each bridge generates a MEMACK# signal to the arbiter 20 in the SIO bridge to indicate that the arbiter 21 may grant access to the SIO bus to the ISA bus master so that the ISA bus master may read data from main memory. In the bridge 17, this MEMACK# signal from the bridge 14 is summed by a summing circuit 48 with an internal local MEMACK# signal from the circuit 42 (and with MEMACK# signals from any other PCI bus bridges) to generate the final MEMACK# acknowledgment to the arbiter 20 that the flushing of buffers has been completed. The summing circuit 48 is essentially a logical AND gate which requires MEMACK# signals from each of the bridges to produce a final MEMACK# signal for the arbiter 20.

Figure 5:
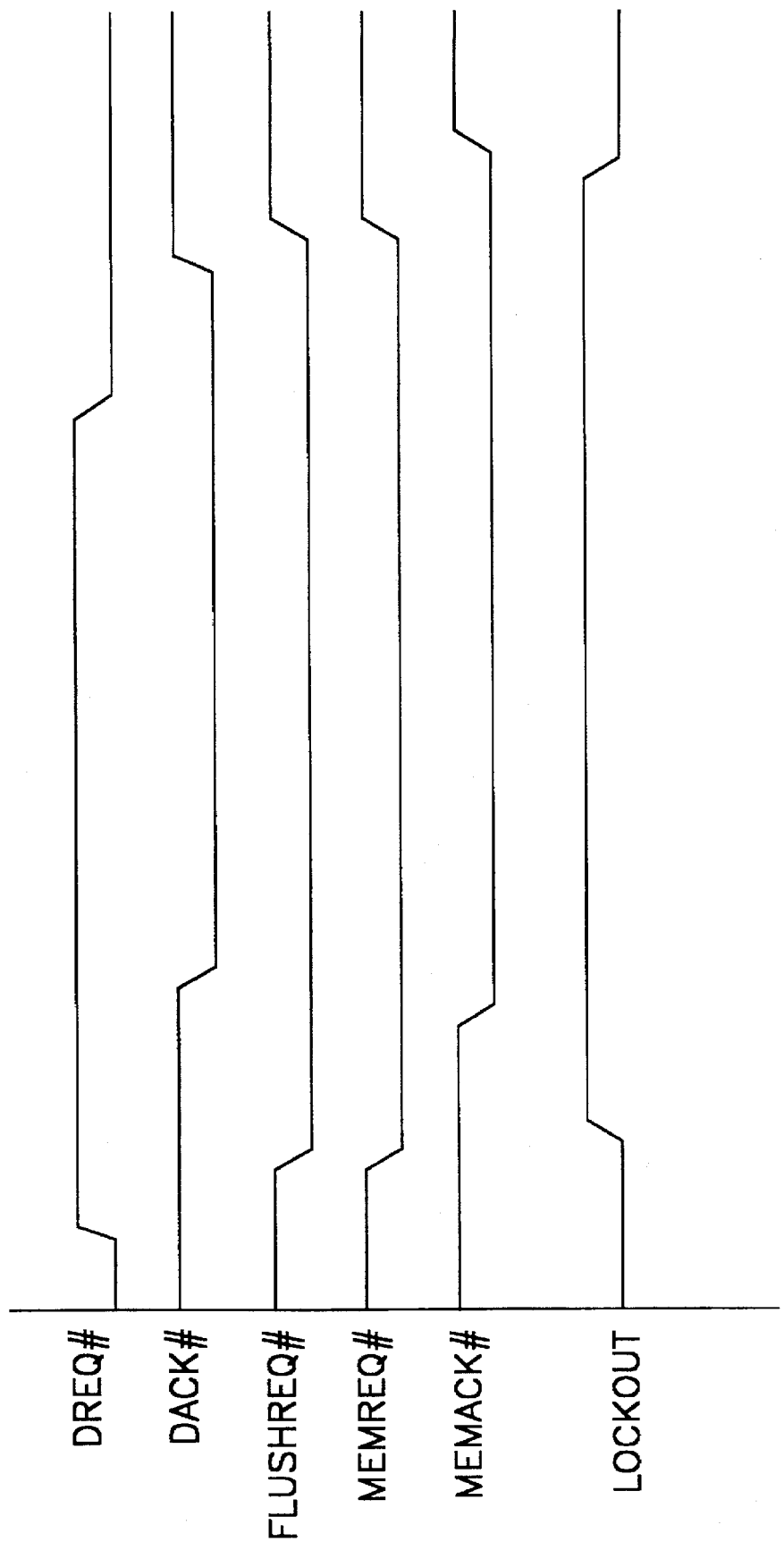
FIG. 5 is a timing diagram illustrating certain control signals utilized in practicing the invention.

The arbiter 20 notifies the arbiter 21 of the receipt of the MEMACK# signal. The arbiter 21 generates an expansion bus master acknowledge signal (which may be a DACK# signal) to the DMA unit to indicate that the flushing has been accomplished. The granting of access to the ISA bus master is accomplished by the DMA unit generating a DACK# signal to the ISA bus master requesting access. The FLUSHREQ# and MEMACK# signals continue until the operation by the ISA bus master is completed. FIG. 5 illustrates the timing of these signals.

Thus, the circuit of the present invention causes the buffers in PCI bridges containing data which might be destined for the ISA bus to be flushed during the arbitration for the PCI bus by the ISA master. The ISA master is only granted access to the ISA bus once this flushing has been accomplished. Because of this, the deadlock condition discussed cannot occur.

In order to meet the time requirements of the ISA bus for an ISA component which has such a requirement (or of a component having a similar time requirement on any other secondary bus), it is necessary to assure that the operation may be completed within the allowed delay time. Access of main memory is one of the most often occurring operations for which an ISA bus master will attempt to gain access of the ISA bus. Since reading from main memory will be delayed if the CPU has stored data in the host-to-main-memory buffers 46 of the bridge 14, such data must also be flushed in order to assure that the ISA bus master may complete its operation in the specified time. In addition, the host CPU normally has access to the host-to-main-memory buffers 46 which are used for transferring data to main memory and could interfere with the ISA master operation.

To eliminate interference with the ISA master needing a guaranteed access time of less than 2.5 microseconds, the arbiter 20 in the SIO chip which controls access to the PCI bus 12 may be caused to generate an additional signal MEMREQ# along with the FLUSHREQ# signal whenever the ISA bus master attempts to gain access to the ISA bus. The SIO bridge includes a PCI arbiter control register 49 which includes one bit referred to as a guaranteed access time (GAT) bit. This bit may be set on system setup whenever, the system includes an ISA device which requires a guaranteed access time. When the single GAT bit is set in the register 49, it indicates to the arbiter 20 that the signal MEMREQ# is to be sent along with the FLUSHREQ# signal when access to the ISA bus is requested by any ISA bus master. The inclusion of the GAT register bit allows a computer designer to determine whether the ISA timing criteria (or a similar criteria for a device on another secondary bus) is to be considered or not. Because some ISA devices are not sensitive to the ISA 2.5 microsecond guaranteed time requirements, the GAT bit position in the PCI arbiter control register 49 may be placed in the unset condition. If the GAT bit is set, the signal MEMREQ# is transferred along with the FLUSHREQ# signal to the bridge 14 joined to a PCI bus 12 to indicate to that bridge 14 that an ISA bus master which may have a time limited criteria desires access to the ISA bus. The PCI arbiter 20 also responds to the GAT bit by precluding any other PCI bus master from gaining ownership of the PCI bus.

The effect of the combination of the FLUSHREQ# signal and this MEMREQ# signal at the bridge 14 is first to lock out the host central processor unit 11 from main memory or the PCI bus. This is accomplished by a lock out signal transferred from the host interface circuit 43 to the CPU 11. The host interface 43 of the bridge 14 accomplishes the lock out of the processor, and then returns a local MEMACK# signal to the summing circuit 44 for transfer to the PCI arbiter 20 to indicate that the lock operation has been accomplished. The FLUSHREQ# and the MEMREQ# signals at the bridge 14 are also transferred to the host-to-main memory control circuit 45, to the host-to-PCI-buffer control circuit 40, and to the summing circuit 44. The host-to-main memory control circuit 45 stores signals indicating the condition of the host-to-main memory buffers 46. The host-to-main memory control circuit 45 causes the host-to-main-memory buffers 46 to be flushed of any data directed to main memory 13. The host-to-PCI-buffer control circuit 40 causes the host-to-PCI-buffers 41 to be flushed. Each circuit 40 and 45 generates a local MEMACK# signal once its flushing operation has been accomplished. In response to the FLUSHREQ# and the MEMREQ# signals, the summing circuit 44 functions in the nature of an AND gate and only generates an external MEMACK# signal to the bridge 17 when all local MEMACK# signals have been received. In this manner, the normal operations of the central processing unit are held in abeyance with respect to the bridge 14 and all bridge buffers in the bridge 14 are flushed before the period in which an ISA bus master is granted access to the ISA bus so that the ISA bus master may access the PCI bus to read from main memory and may do so within the guaranteed access time.

The FLUSHREQ# and MEMREQ# signals are also directed within the SIO bridge 17 in its capacity as a PCI bus master and cause the PCI-expansion-bus buffer control circuit 42 to flush any data in the PCI-to-expansion bus buffers 47 by transferring that data to its designated address in a flush operation. Upon completion of the flush operation, the circuit 42 generates a local MEMACK# signal to indicate this fact.

In the bridge 17, the external MEMACK# signal from the bridge 14 is summed by the summing circuit 48 with the internal local MEMACK# signal from the circuit 42 to generate the final MEMACK# acknowledgment to the arbiter 20 that the flushing of buffers and lockout of the CPU 11 have been completed.

The arbiter 20 notifies the arbiter 21 of the receipt of the MEMACK# signal and the fact that it is locking out other PCI masters. The arbiter 21 generates an expansion bus master acknowledge signal to the DMA unit to indicate that the flushing has been accomplished. The granting of access to the ISA bus master is accomplished by the DMA unit generating a DACK# signal to the ISA bus master requesting access. The FLUSHREQ# and MEMACK# signals continue until the operation by the ISA bus master is completed. FIG. 5 illustrates the timing of these signals.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising
   central processor means;
   first storage means;
   a primary system bus for transferring data and addresses;
     the primary system bus being adapted to provide concurrent usage by a plurality of bus masters;
   a first bridge circuit means for transferring data among the primary system bus, the central processor means, and the first storage means, the first bridge circuit means including second temporary storage means for storing data being transferred among the primary system bus and the central processor means in order to allow concurrent usage by a plurality of bus masters;

a secondary system bus for transferring data and addresses, the secondary system bus being adapted to allow access by only one bus master during any period;

a second bridge circuit means for transferring data between the primary system bus and the secondary system bus, the second bridge circuit means also including second temporary storage means and providing means for allowing a bus master on the secondary system bus to gain access on the primary system bus, the secondary system bus master requiring all of the busing assets of the primary system bus when being accessed by a bus master;

means for indicating that a bus master on the secondary system bus desires access to the secondary system bus;

means responsive to an indication that a bus master on the secondary system bus desires access to the secondary system bus for flushing any data stored in second temporary storage means of any bridge circuit means which data is directed for a component on the secondary system bus and precluding the use of the second temporary storage means by any bus master on the primary system bus until a bus master seeking access on the secondary system bus has completed access of the secondary system bus;

means for indicating that flushing of second temporary storage means has been completed; and means for granting access by a secondary bus master to the secondary system bus.

2. A computer system as claimed in claim 1 in which the means responsive to an indication that a bus master on the secondary system bus desires access to the secondary system bus for flushing any data stored in second temporary storage means of any bridge circuit means which data is directed for a component on the secondary system bus and precluding the use of the second temporary storage means by any bus master on the primary system bus until a bus master seeking access on the secondary system bus has completed access of the secondary system bus, comprises:

means for generating a first signal to each bridge circuit means to indicate that a bus master on the secondary system bus has requested access to the secondary system bus, and control means in each bridge circuit means responsive to the first signal for flushing the second temporary storage means in such bridge and precluding further use of such second temporary storage means while the first signal remains asserted.

3. A computer system as claimed in claim 2 further comprising:

third temporary storage means in the first bridge circuit means for storing data being transferred between the first storage means and other components, and in which the means responsive to an indication that a bus master on the secondary system bus desires access to the secondary system bus for flushing any data stored in second temporary storage means of any bridge circuit means which data is directed for a component on the secondary system bus and precluding the use of the second temporary storage means by any bus master on the primary system bus until a bus master seeking access on the secondary system bus has completed access of the secondary system bus, further comprises:

means for generating a second signal to the first bridge circuit means to indicate that a bus master on the secondary system bus has requested access to the secondary system bus and that the bus master on the secondary system bus requires a guaranteed access time, and control means in the first bridge circuit means responsive to the first and the second signals for flushing the third temporary storage means in such bridge circuit means and precluding further use of such third temporary storage means while the first and second signals remain asserted.

4. A computer system as claimed in claim 3 in which the means for generating a second signal to the first bridge circuit means to indicate that a bus master on the secondary system bus has requested access to the secondary system bus and that the bus master on the secondary system bus requires a guaranteed access time, comprises:

a register for storing data indicating that the bus master on the secondary system bus requires a guaranteed access time, and means for transferring such indication to the means for generating a second signal.

5. A computer system as claimed in claim 3 in which the first bridge circuit means also comprises control means responsive to the first and the second signals for precluding further access of the first bridge circuit means by the central processor means while the first and second signals remain asserted.

6. A computer busing system comprising a primary system bus for transferring data and addresses;

the primary system bus being adapted to provide concurrent usage by a plurality of bus masters;

a first bridge circuit means for transferring data among the primary system bus and a first bus master, the first bridge circuit means including first temporary storage means for storing data being transferred among the primary system bus and the first bus master in order to allow concurrent usage by a plurality of bus masters;

a secondary system bus for transferring data and addresses, the secondary system bus being adapted to allow access by only one bus master during any period;

a second bridge circuit means for transferring data between the primary system bus and the secondary system bus, the second bridge circuit means also including first temporary storage means and providing means for allowing a secondary bus master on the secondary system bus to gain access on the primary system bus, the secondary system bus master requiring all of the busing assets of the primary system bus when being accessed by a secondary bus master;

means for indicating that a secondary bus master on the secondary system bus desires access to the secondary system bus;

means responsive to an indication that a secondary bus master on the secondary system bus desires access to the secondary system bus for flushing any data stored in first temporary storage means of any bridge circuit means which data is directed for a component on the secondary system bus and precluding the use of the first temporary storage means by any bus master on the primary system bus until a secondary bus master seeking access on the secondary system bus has completed access of the secondary system bus;

means for indicating that flushing of first temporary storage means has been completed; and means for granting access by a secondary bus master to the secondary system bus.

7. A computer busing system as claimed in claim 6 in which the means responsive to an indication that a secondary bus master on the secondary system bus desires access to the secondary system bus for flushing any data stored in first temporary storage means of any bridge circuit means which data is directed for a component on the secondary system bus and precluding the use of the first temporary storage means by any bus master on the primary system bus until a secondary bus master seeking access on the secondary system bus has completed access of the secondary system bus, comprises:

means for generating a first signal to each bridge circuit means to indicate that a secondary bus master on the secondary system bus has requested access to the secondary system bus, and control means in each bridge circuit means responsive to the first signal for flushing the first temporary storage means in such bridge and precluding further use of such first temporary storage means while the first signal remains asserted.

8. A computer busing system as claimed in claim 7 further comprising:

means in the first bridge for transferring data among the primary bus, the first bus master, and a primary memory means;

second temporary storage means in the first bridge circuit means for storing data being transferred between the primary storage means and other components, and in which the means responsive to an indication that a secondary bus master on the secondary system bus desires access to the secondary system bus for flushing any data stored in first temporary storage means of any bridge circuit means which data is directed for a component on the secondary system bus and precluding the use of the first temporary storage means by any bus master on the primary system bus until a secondary bus master seeking access on the secondary system bus has completed access of the secondary system bus, further comprises:

means for generating a second signal to the first bridge circuit means to indicate that a secondary bus master on the secondary system bus has requested access to the secondary system bus and that the secondary bus master on the secondary system bus requires a guaranteed access time, and control means in the first bridge circuit means responsive to the first and the second signals for flushing the second temporary storage means in such bridge circuit means and precluding further use of such second temporary storage means while the first and second signals remain asserted.

9. A computer system as claimed in claim 8 in which the means for generating a second signal to the first bridge circuit means to indicate that a secondary bus master on the secondary system bus has requested access to the secondary system bus and that the secondary bus master on the secondary system bus requires a guaranteed access time, comprises:

a register for storing data indicating that the secondary bus master on the secondary system bus requires a guaranteed access time, and means for transferring such indication to the means for generating a second signal.

10. A computer busing system as claimed in claim 8 in which the first bridge circuit means also comprises control means responsive to the first and the second signals for precluding further access of the first bridge circuit means by the first bus master while the first and second signals remain asserted.

11. A computer system comprising a central processor;

main memory;

a primary system bus for transferring data and addresses; the primary system bus being adapted to provide concurrent usage by a plurality of bus masters;

a first bridge circuit for transferring data among the primary system bus, the central processor, and the main memory, the first bridge circuit including a first temporary storage circuit for storing data being transferred among the primary system bus and the central processor in order to allow concurrent usage by a plurality of bus masters;

a secondary system bus for transferring data and addresses, the secondary system bus being adapted to allow access by only one bus master during any period;

a second bridge circuit for transferring data between the primary system bus and the secondary system bus, the second bridge circuit also including a first temporary storage circuit and providing an intercoupling bus master for allowing a bus master on the secondary system bus to gain access on the primary system bus, the secondary system bus master requiring all of the busing assets of the primary system bus when being accessed by a bus master;

a circuit for indicating that a bus master on the secondary system bus desires access to the secondary system bus;

a primary bus arbitration circuit for generating a first signal to each bridge circuit to indicate that a bus master on the secondary system bus has requested access to the secondary system bus in response to an indication that a bus master on the secondary system bus desires access to the secondary system bus;

a first control circuit in the first bridge for flushing any data stored in a first temporary storage circuit of any bridge circuit which data is directed for a component on the secondary system bus and precluding the use of the first temporary storage circuit by any bus master on the primary system bus until a bus master seeking access on the secondary system bus has completed access of the secondary system bus;

a circuit for indicating that flushing of first temporary storage circuits has been completed; and a secondary bus arbitration circuit for granting access by a secondary bus master to the secondary system bus.

12. A computer system as claimed in claim 11 in which the circuit for indicating that flushing of first temporary storage circuits has been completed comprises a multiplexor for summing signals from each bridge circuit indicating that flushing of first temporary storage circuits has been completed, and in which the first control circuit precludes further use by the central processor of such first temporary storage means while the first signal remains asserted.

13. A computer system as claimed in claim 12 further comprising:
a second temporary storage circuit in the first bridge circuit for storing data being transferred between the main memory and other components, and
in which the primary bus arbitration circuit generates a second signal to the first bridge circuit to indicate that a bus master on the secondary system bus has requested access to the secondary system bus and that the bus master on the secondary system bus requires a guaranteed access time, and
a second control circuit in the first bridge circuit responsive to the first and the second signals for flushing the second temporary storage circuit in such bridge circuit and precluding further use of such second temporary storage circuit while the first and second signals remain asserted.

14. A computer system as claimed in claim 13 further comprising:
a register for storing data indicating that the bus master on the secondary system bus requires a guaranteed access time, and
circuitry for transferring such indication to the primary bus arbitration circuit.

15. A computer system as claimed in claim 13 in which the first bridge circuit also comprises a third control circuit responsive to the first and the second signals for precluding further access of the first bridge circuit by the central processor while the first and second signals remain asserted.

16. A computer busing system comprising
a primary system bus for transferring data and addresses; the primary system bus being adapted to provide concurrent usage by a plurality of bus masters;
a first bridge circuit for transferring data among the primary system bus and a first bus master,
the first bridge circuit including first temporary storage circuit for storing data being transferred among the primary system bus and the first bus master in order to allow concurrent usage by a plurality of bus masters;
a secondary system bus for transferring data and addresses,
the secondary system bus being adapted to allow access by only one bus master during any period;
a second bridge circuit for transferring data between the primary system bus and the secondary system bus,
the second bridge circuit also including first temporary storage circuit and providing an intercoupling bus master for allowing a secondary bus master on the secondary system bus to gain access on the primary system bus,
the secondary system bus master requiring all of the busing assets of the primary system bus when being accessed by a secondary bus master;
a circuit for indicating that a secondary bus master on the secondary system bus desires access to the secondary system bus;
a primary bus arbitration circuit for generating a first signal to each bridge circuit to indicate that a bus master on the secondary system bus has requested access to the secondary system bus in response to an indication that a bus master on the secondary system bus desires access to the secondary system bus;

a first control circuit in the first bridge for flushing any data stored in a first temporary storage circuit of any bridge circuit which data is directed for a component on the secondary system bus and precluding the use of the first temporary storage circuit by any bus master on the primary system bus until a bus master seeking access on the secondary system bus has completed access of the secondary system bus;
a circuit for indicating that flushing of first temporary storage circuits has been completed; and
a secondary bus arbitration circuit for granting access by a secondary bus master to the secondary system bus.

17. A computer busing system as claimed in claim 16
in which the circuit for indicating that flushing of first temporary storage circuits has been completed comprises a circuit for summing signals from each bridge circuit indicating that flushing of first temporary storage circuits has been completed, and
in which the first control circuit precludes further use by the central processor of such first temporary storage means while the first signal remains asserted.

18. A computer busing system as claimed in claim 17 further comprising:
a circuit in the first bridge for transferring data among the primary bus, the first bus master, and a primary memory;
a second temporary storage circuit in the first bridge circuit for storing data being transferred between the primary storage circuit and other components, and
in which the primary bus arbitration circuit generates a second signal to the first bridge circuit to indicate that a bus master on the secondary system bus has requested access to the secondary system bus and that the bus master on the secondary system bus requires a guaranteed access time, and
a second control circuit in the first bridge circuit responsive to the first and the second signals for flushing the second temporary storage circuit in such bridge circuit and precluding further use of such second temporary storage circuit while the first and second signals remain asserted.

19. A computer system as claimed in claim 18 further comprising:
a register for storing data indicating that the secondary bus master on the secondary system bus requires a guaranteed access time, and
circuitry for transferring such indication to the means for generating a second signal.

20. A computer busing system as claimed in claim 18 in which the first bridge circuit also comprises a third control circuit responsive to the first and the second signals for precluding further access of the first bridge circuit by the first bus master while the first and second signals remain asserted.

21. A method for eliminating deadlock in a multibus computer system which system includes a primary bus, a secondary bus, a first bridge circuit for joining the primary bus to a bus master and a primary storage means, a second bridge circuit for joining the primary bus to the secondary bus, the method comprising:
causing the second bridge circuit to generate a first signal directed to all bridge circuits to indicate that a bus master on the secondary bus desires access to the secondary bus,
flushing all temporary storage means in all bridge circuits holding data directed to a component on the secondary bus, generate a second signal to indicate that all temporary storage means in all bridge circuits holding data directed to a component on the secondary bus have been flushed, and transferring access to the secondary bus to a bus master on the secondary bus requesting access to the secondary bus.

22. The method claimed in claim 21 further comprising the steps of:

testing to determine whether a bus master on the secondary bus requires a guaranteed access time, causing the second bridge circuit to generate a third signal directed to the first bridge circuit to indicate that a bus master on the secondary bus desiring access to the secondary bus requires a guaranteed access time, flushing all temporary storage means in the first bridge circuits holding data directed to a main memory, and precluding access of the first bridge circuit by a bus master joined to the first bridge circuit while the bus master on the secondary bus has access to the secondary bus.

\* \* \* \* \*